(12) United States Patent
Benavides et al.

(10) Patent No.: US 11,815,074 B1
(45) Date of Patent: Nov. 14, 2023

(54) SCALABLE POWER PROCESSING UNITS FOR HALL-EFFECT THRUSTER PROPULSION SYSTEMS AND TERRESTRIAL SYSTEMS

(71) Applicant: United States of America as represented by the Administrator of NASA, Washington, DC (US)

(72) Inventors: Gabriel F. Benavides, Cleveland, OH (US); Luis R. Pinero, Cleveland, OH (US); Corey R. Rhodes, Cleveland, OH (US); Arthur Birchenough, Cleveland, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 210 days.

(21) Appl. No.: 16/912,946

(22) Filed: Jun. 26, 2020

Related U.S. Application Data

(60) Provisional application No. 62/868,322, filed on Jun. 28, 2019.

(51) Int. Cl.
*F03H 1/00* (2006.01)
*B64G 1/40* (2006.01)

(52) U.S. Cl.
CPC ......... *F03H 1/0075* (2013.01); *F03H 1/0012* (2013.01); *F03H 1/0018* (2013.01); *B64G 1/405* (2013.01)

(58) Field of Classification Search
CPC ..... F03H 1/0018; F03H 1/0075; F03H 1/0012
See application file for complete search history.

(56) References Cited

U.S. PATENT DOCUMENTS

| | | | | |
|---|---|---|---|---|
| 4,766,724 A | * | 8/1988 | Gruber | F03H 1/00 219/383 |
| 5,359,180 A | * | 10/1994 | Park | B64G 1/428 307/85 |
| 8,084,885 B1 | * | 12/2011 | Zansky | H02J 1/10 307/60 |
| 2007/0145901 A1 | * | 6/2007 | Tamida | F03H 1/0018 315/111.61 |
| 2020/0343810 A1 | * | 10/2020 | Xu | H02M 3/33592 |

* cited by examiner

*Primary Examiner* — Arun Goyal
*Assistant Examiner* — William L Breazeal
(74) *Attorney, Agent, or Firm* — Robert H. Earp, III; Mark Wolfgang; Trenton J. Roche

(57) ABSTRACT

Scalable power processing units (PPUs) for Hall-effect thrusters (HETs) and terrestrial systems are disclosed. A technique for current estimation may be employed on each output of parallel isolated discharge supply modules (DSMs) to force proper current/load sharing between the DSMs. A flyback power supply may be used that performs the dual functions of a cathode keeper plasma ignitor and sustainer. The flyback power supply may be tuned for a high no-load direct current (DC) output voltage to achieve cathode keeper ignition rather than requiring a separate ignitor supply, which reduces circuit complexity. To address requirements for higher voltage DC ignition than are achievable with a flyback power supply alone, a supplemental DC ignitor may be placed in parallel with the flyback power supply of some embodiments. Such simplified PPU architectures may provide a high efficiency, low part count, scalable architecture suitable for more compact and lower cost system designs.

10 Claims, 12 Drawing Sheets

SCALABLE POWER PROCESSING UNITS FOR HALL-EFFECT THRUSTER PROPULSION SYSTEMS AND TERRESTRIAL SYSTEMS

CROSS-REFERENCE TO RELATED APPLICATION

This application claims the benefit of U.S. Provisional Patent Application No. 62/868,322 filed Jun. 28, 2019. The subject matter of this earlier filed application is hereby incorporated by reference in its entirety.

ORIGIN OF THE INVENTION

The invention described herein was made by employees of the United States Government and may be manufactured and used by or for the Government for Government purposes without the payment of any royalties thereon or therefore.

FIELD

The present invention generally relates to power processing, and more particularly, to scalable power processing units (PPUs) for space vehicles and/or components thereof.

BACKGROUND

The Hall-effect thruster (HET) is the most successful in-space electric propulsion technology by quantity of units flown. The first HET flew in space in the early 1970s and approximately another 1,000 HETs have flown since. As such, HETs are generally considered a mature technology. However, recent trends in HET application have sought to further lower cost, increase electrical efficiency, maximize propellant throughput capability, and optimize volume utilization. These improvements are especially sought after for the application of HETs to small spacecraft, where power, mass, volume, propellant-throughput, and cost are frequent spacecraft design drivers.

Recent growth in the application of HETs for commercial missions can be attributed to their simple design relative to other forms of electric propulsion, historically well-demonstrated reliability, good efficiency, high specific impulse, and high thrust-to-power ratio. Although the higher voltage gridded-ion thrusters (GIT) can achieve even higher specific impulse than HETs, HETs offer greater thrust, which shortens spacecraft transit time. HETs can achieve higher thrust-to-power ratios than GITs because the higher density quasi-neutral HET plasma is not subject to space-charge limitations as are GITs. On the other end of the spectrum, arcjets provide significantly higher thrust than HETs. However practical design limitations prevent arcjets from matching the specific impulse and electrical efficiency achieved with HETs and GITs. For many missions, HETs provide a good balance of specific impulse, thrust, cost, and reliability.

Figure 1:
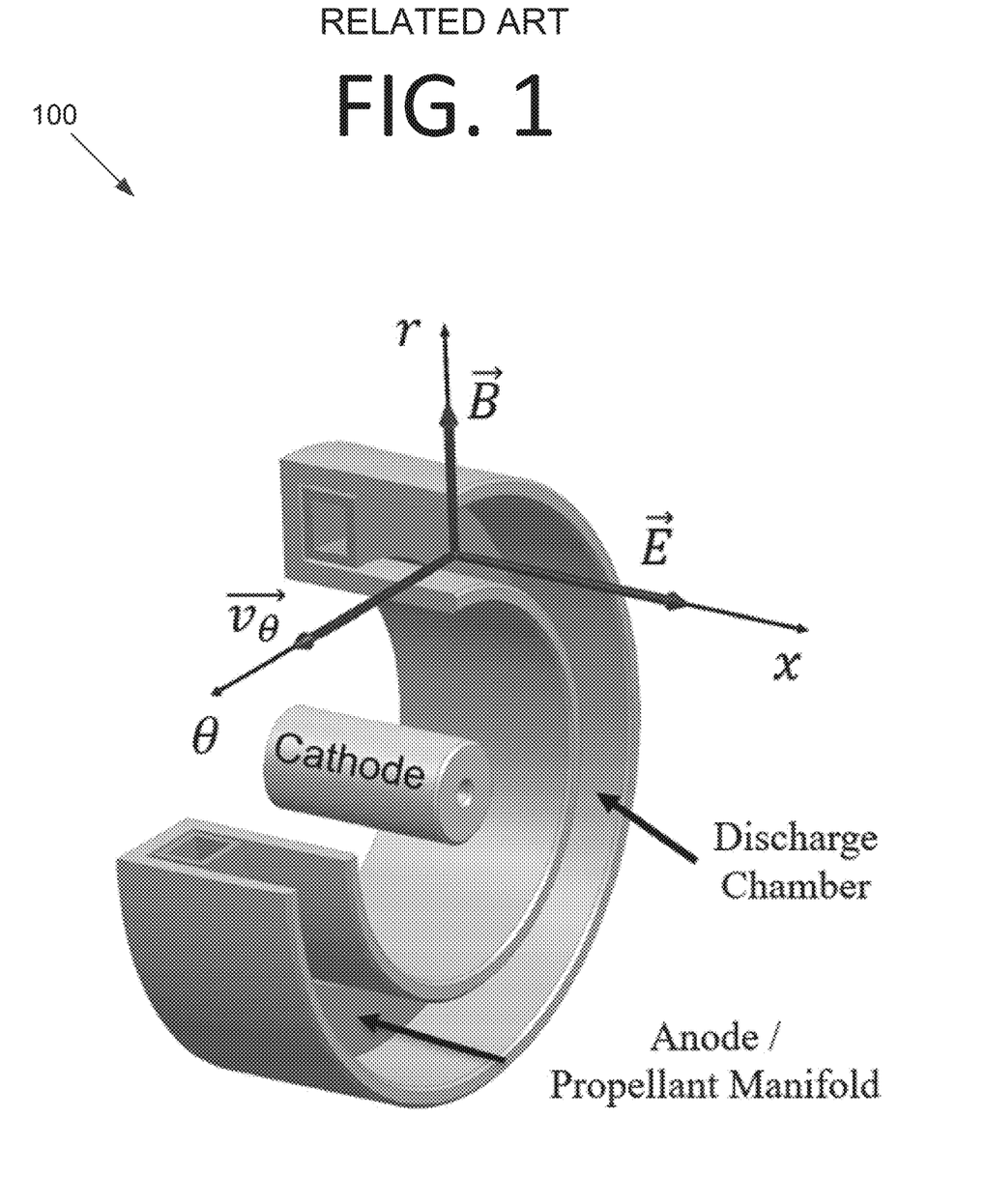
FIG. 1 is a perspective cutaway view illustrating a HET.
Figure 2:
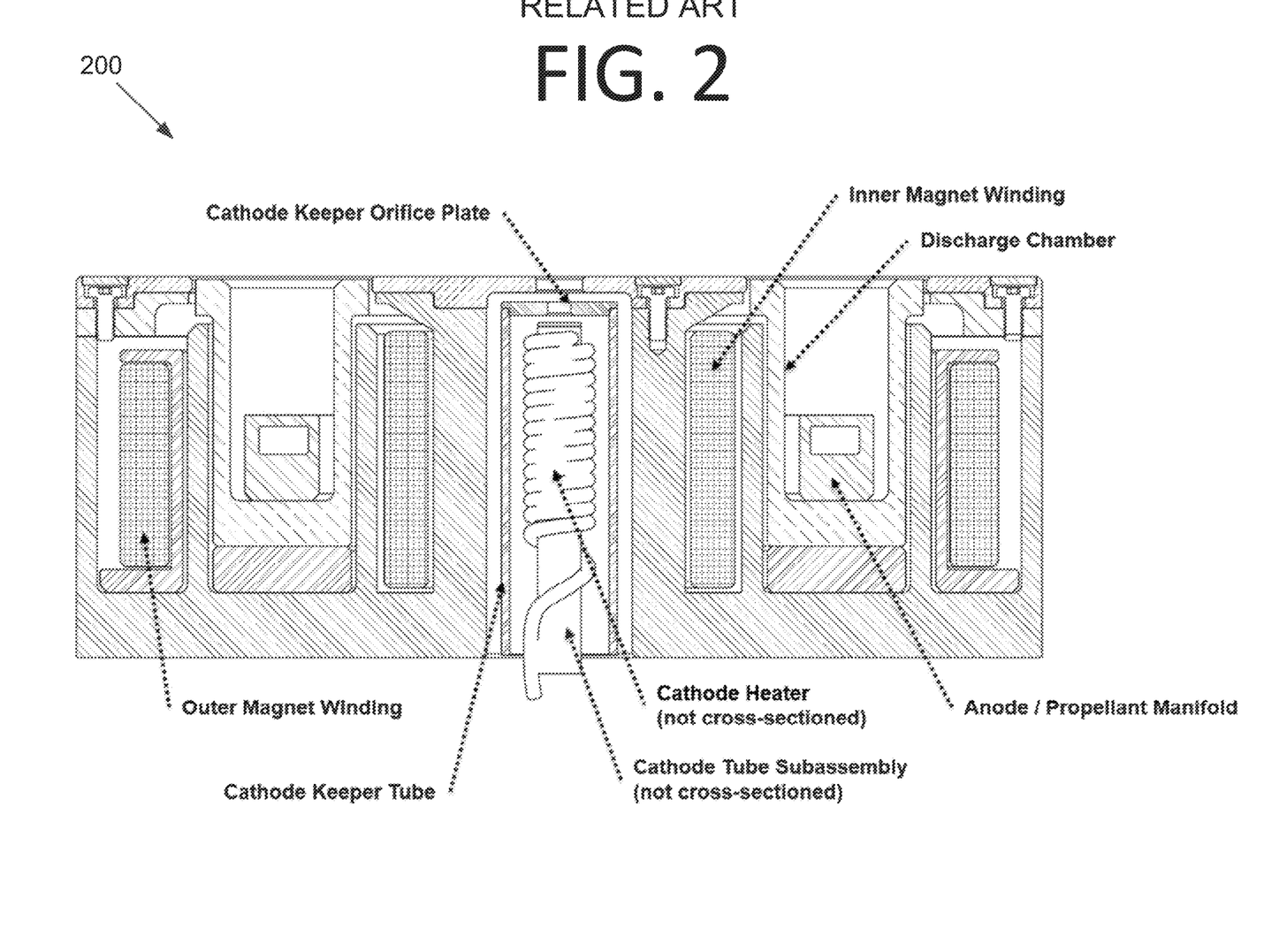
FIG. 2 is an architectural diagram illustrating a HET design.

As schematically shown in HET 100 of FIG. 1, HETs apply a strong axial electric field and radial magnetic field near the discharge chamber exit plane. The $\vec{E} \times \vec{B}$ force greatly slows the mean axial velocity of electrons and results in an azimuthal electron current many times greater than the beam current. This azimuthal current collisionally ionizes the incoming neutral propellant. These ions are then electrostatically accelerated and only weakly affected by the magnetic field. The electron source is a low work function material typically housed in a refractory metal structure, historically located external to the HET body. However, recent thruster designs have begun centrally mounting the cathode in the HET body, as shown in HET design 200 of FIG. 2. The cathode feeds electrons to the HET plasma and neutralizes the plasma plume ejected from the thruster. The high voltage annular anode sits at the rear of the discharge chamber and typically also functions as the propellant distribution manifold.

Figure 3:
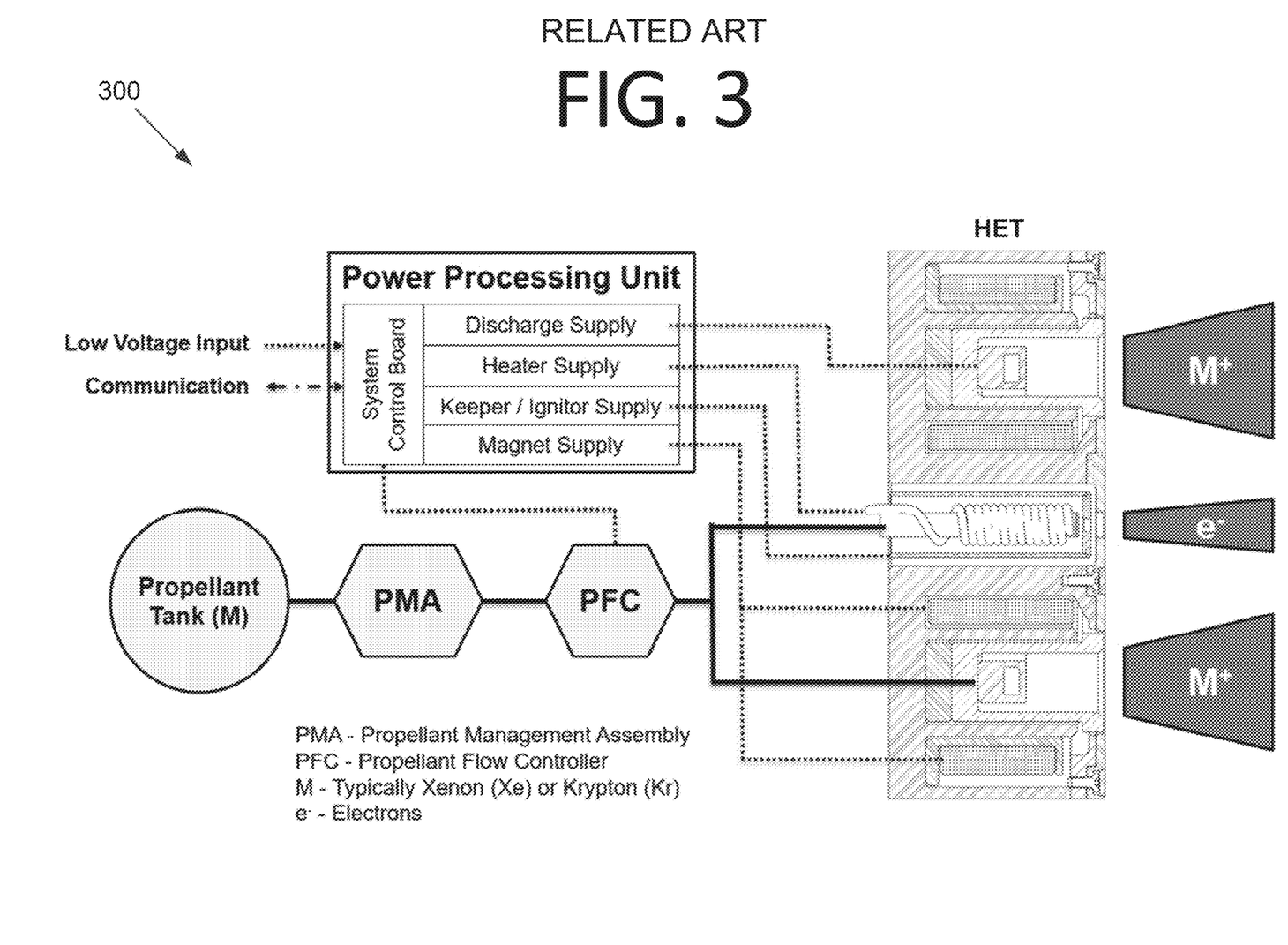
FIG. 3 is an architectural diagram illustrating a Hall-effect propulsion system.

One implementation of a HET is shown as part of a complete propulsion system 300 in FIG. 3. Propulsion system 300 consists of: (i) a HET; (ii) a power processing unit (PPU); (iii) a propellant tank; (iv) a propellant management assembly (PMA); and (v) a propellant flow controller (PFC). The PPU accepts low voltage power (i.e., lower than the discharge voltage) from the spacecraft and converts the power to the necessary voltages and currents for thruster operation. Typically, the PPU includes: (i) a discharge power supply that provides high voltage to the thruster anode; (ii) a heater power supply that provides high current to the cathode heater to support cathode ignition; (iii) a cathode ignitor power supply that provides high voltage and low current pulsing to the cathode keeper to support cathode ignition; (iv) a cathode keeper power supply that provides a modest sustainer voltage and current to the cathode keeper following ignition; and (v) a magnet power supply that provides modest voltage and current to the thruster electromagnets to maintain the radial magnetic field.

The PPU may combine the heater, keeper, and magnet power supply functions into two or fewer power supplies. This reduces functionality, but also reduces PPU complexity and cost. If a heater-less cathode is used, no cathode heater power supply is required. The system control board (SCB) accepts commands from the spacecraft, returns telemetry, and manages the various power supplies internal to the PPU. The PPU also powers and regulates the propellant flow controller to deliver the appropriate level of propellant to the thruster.

The propellant tank is typically a high-pressure vessel for storage of the propellant, although novel propellants such as iodine may have different storage requirements than heritage propellants such as xenon and recently krypton. The PMA typically manages the propellant pressure supplied to the PFC. Additionally, the PMA may include fill and drain valves, isolation valves, and sensors. The PMA is managed by the spacecraft, whereas the PFC is managed by the PPU.

The PFC may consist of one or more propellant flow control elements, such as proportional control valves, thermal throttles, solenoid valves, latch valves, filters, or restrictors. A simple PFC may include a proportional flow control valve followed by a flow split, including flow restrictors on each leg of the split that deliver a predetermined percentage of the total propellant flow to the anode and cathode. The PPU can adjust the total flow rate from no-flow to max-flow, while the fractional flow split between the anode and cathode remains unchanged based on the ratio of the flow properties of the restrictors. The power consumption of a HET is approximately proportional to the propellant flow rate. Thus, the PPU can affect the HET power consumption by regulating the propellant flow rate and monitoring the thruster current. More complex PFCs may include independent anode and cathode proportional flow control valves, pressure sensors, and temperature sensors, but largely accomplish the same functions with some added capability. For propulsion systems employing xenon propellant, the PFC may be commonly referred to as the xenon flow controller (XFC).

Perhaps, the most critical element of the PPU can be considered to be the discharge power supply, which processes up to 95% of the power in the PPU and must produce the high voltage needed to accelerate the thrust generating plasma. For high-power HETs, or low-power HETs with large voltage step-up requirements, large input currents will be present on the primary side of the power supply. Processing this current efficiently is critical to maximizing the overall efficiency and limiting the heat dissipated into the spacecraft. Such circumstances may encourage the use of a modular architecture for the discharge power supply. Operating multiple lower power modules in parallel handles the large input currents more efficiently, as well as provides a design that is scalable to fit mission need and offer inherent redundancy. The discharge power supply modules are referenced to the HET cathode and should provide galvanic isolation from the cathode to the spacecraft chassis.

In modular isolated power supply architectures, a method of forcing current sharing between the modules is required to ensure each module shares the load approximately equally. Severe imbalances in the load sharing between power modules can result in excessive electrical stress or heating on an individual module, which can ultimately lead to failure of the power supply. The common approach is to sense the output current on each module, providing feedback to the power supply controller. The controller can regulate the output current on each module to a specified level. Typically, the output current information is obtained by sensing the voltage drop across a shunt resistor on the output module. However, in the case of an isolated power supply, which has a different voltage reference between its output and input, obtaining a reliable current measurement can require a significant amount of sensing circuitry due to common-mode voltage across the shunt that can corrupt the measurement. Additionally, the current needs to be sensed at the output of every module to implement the current feedback, which means the shunt resistor and the associated sensing circuitry needs to be repeated for every module. In larger power supplies, which may have several modules implemented to process the total power, efficiency losses in each of the shunts, and component cost from the repeated circuitry can become significant.

Every HET requires a high voltage power supply (commonly referred to as the cathode ignitor) to ignite the cathode discharge and a lower-voltage power supply (commonly referred to as the keeper or cathode sustainer power supply) to sustain the local cathode plasma in the absence of the main HET discharge. In existing power supplies, the cathode ignition is provided by a pulsed high voltage source. Commonly, this is accomplished by adding a flyback winding onto the main output inductor in the keeper power supply. An additional switching circuit pulses this additional winding on the output inductor to achieve the high voltage pulses needed for cathode ignition. However, this additional winding that is added to the output inductor increases the winding complexity, size, and cost of the inductor in addition to requiring the extra switching and pulse forming components. The keeper power converter architecture has typically been full-bridge, push-pull, or resonant based topologies. These topologies can be complex and have a high component count for the power levels that are typically required for the sustainer supply.

Accordingly, an improved PPU that solves one or more of these problems may be beneficial.

SUMMARY

Certain embodiments of the present invention may provide solutions to the problems and needs in the art that have not yet been fully identified, appreciated, or solved by current power processing technologies. For example, some embodiments of the present invention pertain to scalable PPUs for HETs and/or components thereof that may reduce circuit complexity. The PPUs of some embodiments may enable spacecraft (e.g., CubeSats in the 5-50 kilogram (kg) range or SmallSats in the 50-300 kg range) to incorporate sub-kilowatt Hall-effect thruster-based propulsion systems and/or may provide sufficient power processing for missions beyond low Earth orbits (LEOs).

The architecture of some embodiments implements a technique for current estimation on each output of parallel isolated discharge supply modules (DSMs) to force proper current sharing between modules. This technique of current estimation, rather than current sensing, may reduce part count and increase PPU electrical efficiency. The architecture may implement a flyback power supply performing the dual functions of cathode plasma ignitor and sustainer. The flyback power supply may be tuned for a high no-load direct current (DC) output voltage to achieve HET cathode ignition rather than requiring a separate cathode ignitor supply, which reduces circuit complexity. To address application-specific requirements for higher voltage DC ignition than are achievable with a flyback power supply alone, a low part count open-loop push-pull converter may be placed in parallel with the flyback power supply of some embodiments. Such simplified PPU architectures may provide a high efficiency, low part count, scalable architecture suitable for more compact and lower cost HET propulsion system designs.

In an embodiment, a scalable PPU includes a plurality of parallel DSMs including respective current estimator circuits. Each of the plurality of current estimator circuits is configured to provide a representative signal of an output current for the respective parallel DSM. The PPU also includes a cathode ignitor/keeper flyback power supply circuit configured to ignite and sustain plasma at a cathode.

In another embodiment, a DSM includes a current estimator circuit configured to use a primary current signal and an output voltage feedback signal from the DSM without additional sensing to provide a representative signal of an output current of the DSM.

In yet another embodiment, a cathode ignitor/keeper flyback power supply circuit includes a MOSFET, a main power transformer operably connected to the MOSFET and including a primary winding and a secondary winding, and a load operably connected to a secondary side of the main power transistor. The MOSFET is configured to apply an excitation voltage from a voltage source to a main power transformer. The primary winding and the secondary winding of the main power transformer are setup in a "flyback" configuration such that when the MOSFET is on, a primary side of the main power transistor is charged and no current flows in the secondary winding, and when the MOSFET is turned off, stored energy in the main power transistor is transferred to the secondary winding and released into the load. The cathode ignitor/keeper flyback power supply circuit is configured to output a no-load DC output voltage to achieve cathode ignition.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Some embodiments pertain to scalable PPUs for HETs and/or components thereof that may reduce circuit complexity. The PPU architecture of some embodiments implements a technique for current estimation on each output of parallel isolated discharge supply modules (DSMs) to force proper current sharing between modules. This technique of current estimation, rather than current sensing, may reduce part count and increase PPU electrical efficiency. This may be accomplished via an output current estimator circuit on the DSMs that use primary current and output voltage feedback signals without the need of additional sensing to generate a representative signal of the output current of each discharge module. This representative signal may then be used by a pulse-width-modulation (PWM) circuit to force load sharing between the parallel discharge modules.

In certain embodiments, the architecture implements a combined cathode ignitor/keeper flyback power supply circuit performing the dual functions of cathode plasma ignitor and sustainer. The flyback power supply circuit may be tuned to output a high no-load DC output voltage to achieve HET cathode ignition rather than requiring a separate high voltage ignitor supply, which reduces circuit complexity. Indeed, a separate high voltage ignitor circuit is not required in some embodiments. The flyback power supply may act as both the cathode ignitor and sustainer. Unlike previous power supplies, the ignitor of some embodiments is DC and not pulsed.

Although the flyback ignitor/keeper supply described above provides a sufficient no-load output voltage to easily ignite the cathode at nominal conditions in some embodiments, it may not output sufficiently high voltage to meet commonly accepted HET requirements for end-of-life cathode ignition. For instance, while the flyback ignitor/keeper supply of some embodiments may have a maximum output of 150 volts (V) and can perform sustaining of cathode plasma after ignition, a 300-600 V capability may be required. To address these end-of-life requirements for higher voltage DC ignition than achievable with the flyback power supply, a high voltage DC supply may be placed in parallel in some embodiments. This converter may generate higher DC voltages if the flyback ignitor/keeper fails to achieve ignition. In certain embodiments, the high voltage DC supply may be a low part count open-loop push-pull converter (e.g., a voltage multiplier circuit). Such simplified PPU architectures may provide a high efficiency, low part count, scalable architecture suitable for more compact and lower cost HET propulsion system designs.

Figure 4:
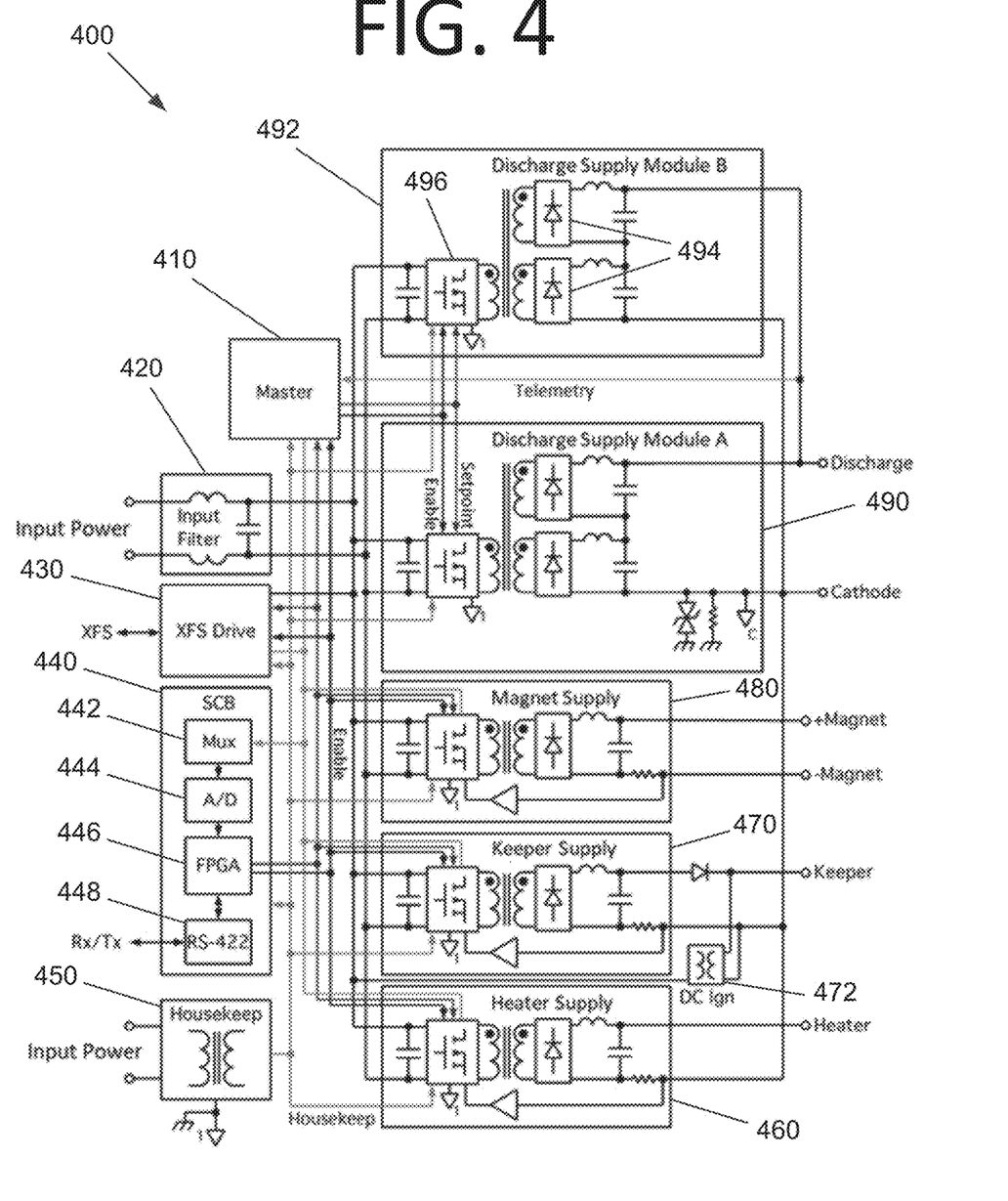
FIG. 4 is a circuit diagram illustrating a PPU, according to an embodiment of the present invention.

FIG. 4 is a circuit diagram illustrating a PPU 400, according to an embodiment of the present invention. A master controller 410 sends/receives set-point, enable, telemetry, and housekeeping signals to/from other components. Master controller 410 also manages current sharing between parallel DSMs 490, 492, as guided by current estimators (not shown—see FIG. 5, for example). Master controller 410 generally controls the operation of PPU 400. Controlling discharge current regulation or current limit mitigates damage to the thruster during faults and enables glow-mode thruster start-ups.

An input filter 420 filters the input voltage (e.g., 24-34 V) and reduces emissions. Input filter 420 may operate in differential mode or common mode in some embodiments. A xenon feed system (XFS) drive board 430 allows PPU 400 to regulate the propellant flow rate, which in turn throttles the thruster electrical power draw from DSMs 490, 492. XFS drive board 430 may more generically be referred to as a propellant flow system drive when regulating non-xenon propellants.

A system control board (SCB) 440 receives propulsion commands from and sends telemetry and status flags to the spacecraft. SCB 440 executes programmed control sequences for the electric propulsion system, sets each power module operating condition, enables power modules at the required intervals, regulates propellant flow rate, senses for fault conditions, and disables the thruster when necessary. SCB 440 includes a multiplexor 442 for signal multiplexing, an analog-to-digital (A/D) converter 444 for A/D signal conversion, a field programmable gate array (FPGA) 446 for processing, and an RS-422 serial data standard-compliant circuit 448 for transmitting communications to and receiving communications from the spacecraft.

FPGA 446 provides a good compromise between programming functionality, complexity, and cost. FPGA 446 provides programmable logic for PPU 400, although microprocessors and discrete-circuit state machines may be used in some embodiments without deviating from the scope of the invention.

A housekeeping circuit 450 converts an unregulated input voltage (e.g., 24-34 V) to regulated output voltages, as typically required for PPU functions (e.g., regulated 5 V, +/−15 V). A cathode heater power supply 460 is used during startup to condition the cathode to emit electrons. A cathode keeper power supply 470 maintains operation of the cathode plasma when the discharge current is insufficient or nonexistent, such as during startup or low-end power operation. A magnet power supply 480 energizes the HET electromagnets and provides the ability to reverse magnetic field polarity to switch the direction of the swirl torque.

A pair of DSMs 490, 492 are connected in parallel in this embodiment. PPU 400 thus permits operation of HETs of more than one power scale. By design, a single discharge module could operate a low power HET. Two discharge modules could operate an HET with up to twice the power requirements of a single DSM. Three or more DSMs could provide further power capacity to operate HETs at even higher operating conditions and/or to provide module redundancy. However, any number of DSMs may be used without deviating from the scope of the invention.

Parallel DSMs 490, 492 offer numerous benefits. The approach not only enables PPU scaling to accommodate operation of a wide range of HET devices, but also supports higher power thrusters not yet considered, thus reducing future development costs for the end user. Splitting the load between DSMs 490, 492 reduces component stress compared to a single higher power discharge module. This is especially true given the high voltage transformer step-up ratio required with a low voltage bus input. By further including current estimators, load balancing between DSMs 490, 492 may also be performed.

The approach of some embodiments further provides improved electrical efficiency as compared to a single DSM. Other benefits include, but are not limited to, the ability to stagger switching to reduce current ripple or disable/enable modules as operating conditions change to optimize efficiency. Drawbacks of using multiple DSMs include a higher parts count, mass, and cost than a single DSM. Additionally, multiple DSMs should have a master controller (e.g., master controller 410) to manage current sharing, although this can readily be integrated within one of DSMs 490, 492 in some embodiments. A multi-module discharge supply provides a straightforward approach to provide scalability without developing and maintaining a costly product line of different PPUs with different powers.

Rectifiers 494 of DSMs 490, 492 are connected as a pair in series in this embodiment. Series rectifiers 494 reduce output voltage component stress (e.g., output diode voltage stress) as compared to a single rectifier stage. Additional rectifier stages can be added to provide a higher output voltage, although electrical efficiency declines and parts count increases with each stage. Higher voltage components may also be implemented than considered for this architecture to limit the number of stages. Each DSM 490, 492 has a power stage 496 that includes both discharge voltage and current regulation loops (i.e., current limit) to prevent damage to the thruster during faults and to enable glow-mode thruster startup.

Per the above, a complication of a common ignitor/keeper topology approach is the challenge of meeting the high voltage output requirements for cathode keeper ignition at end-of-life. While many high power PPUs employ a separate high voltage pulsed ignitor, such a pulsed-ignitor design may not fit the expected cost and form factor for a low-cost small spacecraft PPU. Instead, a DC ignitor 472 is used in this embodiment, which is substantially more compact and requires fewer components as compared to pulsed ignitors.

Current Estimator

Conventionally, discharge power supplies are placed in parallel due to the relatively large amount of power that is processed. An isolated discharge power supply consisting of several power modules operating in parallel to achieve higher total operating powers requires that each module shares the current load equally. Output current feedback typically employed on each module to effectively make each module a controlled current source requires that the output current sense be done on each module. This results in significant complexity and parts count in conventional circuits and results in another voltage drop and energy loss.

However, in some embodiments, an isolated discharge supply module output current estimator circuit is employed that uses the sensed primary current and output voltage as feedback without the need of additional sensors (e.g., output current sensors) to generate a representative signal of the output current of each discharge module. This representative signal may then be used with a PWM circuit to force load sharing between parallel DSMs. Such an approach requires little additional circuitry to estimate the current on the output and avoids the technical challenges of measuring the output current directly.

If the discharge power supply is an isolated buck derived converter, there is a large output filter inductor that is in series with the load current in some embodiments. Every switching cycle, the current through this output inductor will rise and fall with slopes determined by the value of the inductor and the voltages applied to the inductor. The primary side transformer signal can be used to obtain the rising slope of the output inductor current information. The rising slope information can be measured with a current transformer on the primary side, buffered, and then the peak value of the current signal can be held by a capacitor. The downslope of the output inductor current can then be estimated based on the output voltage telemetry and the known inductance value. A circuit configured as a voltage-controlled current source may then use the voltage telemetry information to adjust the rate at which the peak holding capacitor is discharged to create a voltage signal that is a scaled representation of the actual output inductor current. This signal may then be used for the DSM feedback and be input to the error amplifier of a PWM controller.

The current estimator of some embodiments eliminates the need for physically sensing the output current on each DSM. The technique may only require the output voltage information to accomplish current sharing for all DSMs, which is already measured for other required feedback functions in some embodiments. This may eliminate the need of measuring output current on an isolated power supply through traditional techniques that reduce efficiency and increase circuit complexity.

Figure 5:
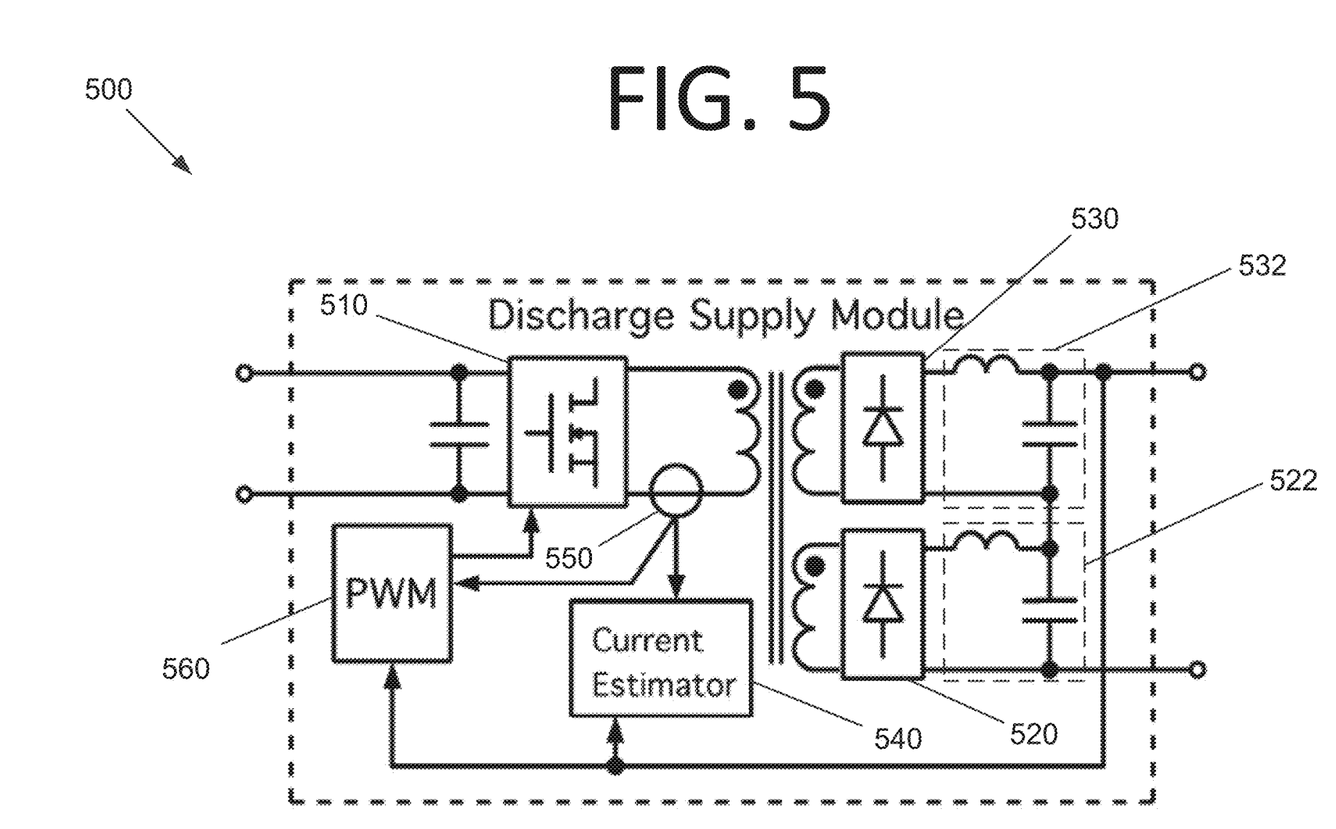
FIG. 5 is a circuit diagram illustrating a DSM that includes a current estimator, according to an embodiment of the present invention.

FIG. 5 is a circuit diagram illustrating a DSM 500 that includes a current estimator, according to an embodiment of the present invention. In some embodiments, DSM 500 may be used as DSM 490 and/or 492 in PPU 400 of FIG. 4 (i.e., DSM 490 and/or 492 may include the full bridge power components along with the PWM controller and current estimator). However, it should be noted that DSM 500 may be used for any suitable space or terrestrial current estimation applications without deviating from the scope of the invention.

As with DSMs 490, 492, DSM 500 includes a power stage 510 and a pair of series rectifiers 520, 530. The black dots at the junction of some lines represent electrical connections. LC filters 522, 532 low-pass filter and average the voltage waveform from respective rectifiers 520, 530 before the voltage waveform is measured for telemetry and by a current estimator circuit 540. Current estimator circuit 540 receives the output voltage information through one such connection, which is the total voltage produced from the series combination of rectifiers 520, 530.

The primary side current is sensed by two primary side current transformers shown as an open loop 550 with one primary sense going to a PWM controller 560 and the other to current estimator circuit 540. Current estimator circuit 540 uses the output voltage information as well as the sensed primary side current to perform the output current estimation. The output current estimation and sensed output voltage is used to regulate PWM controller 560 (e.g., to a user-defined DSM power set-point).

Figure 6:
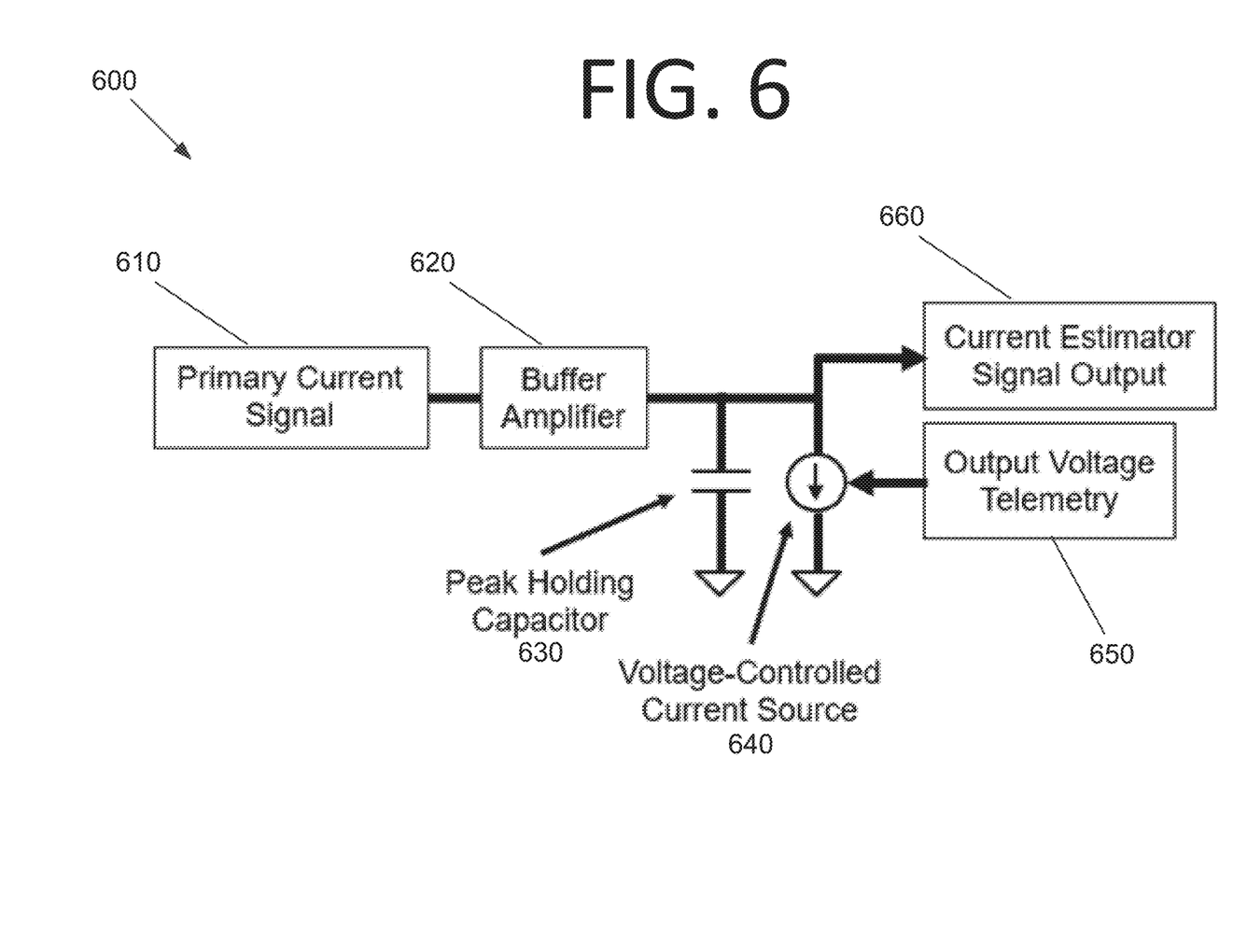
FIG. 6 is an architectural diagram illustrating a current estimator circuit, according to an embodiment of the present invention.

By employing the current estimation approach of some embodiments, such as current estimator circuit 540 shown in FIG. 5, eliminates the need to sense the output current directly on each module. Therefore, having a shunt resistor and the associated sensing circuitry on each module is no longer required in some embodiments. Further details of a current estimator 600 are shown in FIG. 6. In some embodiments, current estimator 600 may be current estimator circuit 540 of FIG. 5. However, it should be noted that current estimator 600 may be used for any suitable space or terrestrial current estimation applications without deviating from the scope of the invention. In current estimator 600, a primary current signal 610 from a DSM (e.g., DSM 500) is buffered via a buffer amplifier 620. Primary current signal 610 provides a representation of the upslope in the output current of the DSM.

The peak value of the current signal after being buffered is held by peak holding capacitor 630. The downslope of the current can then be estimated via a circuit configured as a voltage-controlled current source circuit 640 based on an output voltage telemetry 650 and the known inductance value. The voltage telemetry is a scaled measurement of voltage output (e.g., $\frac{1}{100}^{th}$ of the actual voltage, such as 300 V reduced to 3 V).

Voltage-controlled current source circuit 640 may then use output voltage telemetry 650 to adjust the rate at which peak holding capacitor 630 is discharged to create a current estimator voltage signal output 660 that is a scaled representation of the actual output inductor current. Current estimator voltage signal output 660 now provides an actual scaled representation of the output inductor current, and this information can be used for the DSM feedback and be input to the error amplifier of a PWM controller (e.g., PWM controller 560 of FIG. 5).

Figure 7:
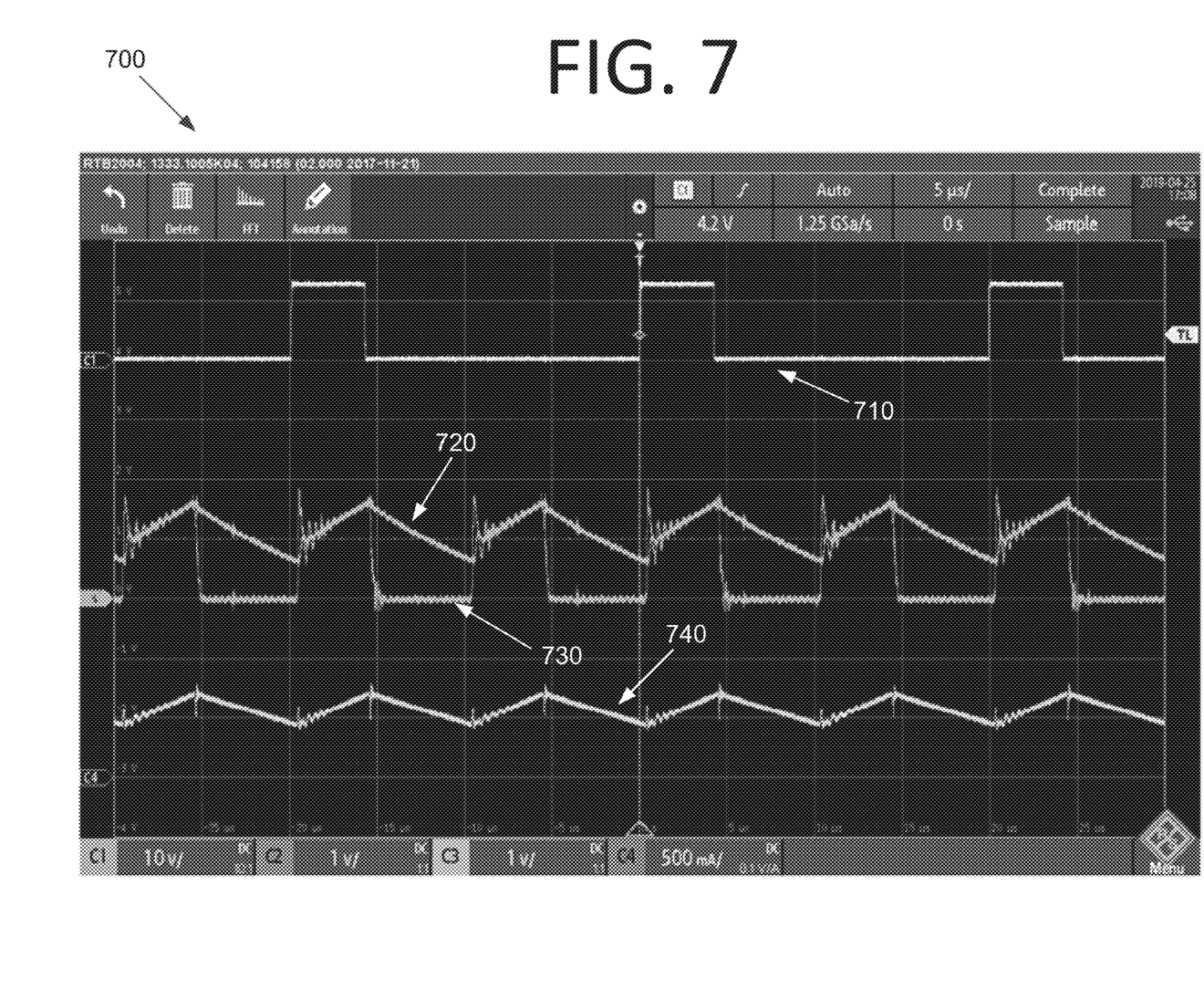
FIG. 7 is a graph illustrating current estimator testing results, according to an embodiment of the present invention.

FIG. 7 is a graph 700 illustrating current estimator testing results, according to an embodiment of the present invention. More specifically, graph 700 plots PWM output 710, current estimator signal output 720, primary current signal 730, and output inductor current 740. The upslope of current estimator signal output 720 matches the upslope of primary current signal 730, which is a scaled version of the upslope in output inductor current 740. The downslope of current estimator signal output 720 matches the downslope of output inductor current 740. The current estimator of some embodiments allows the design to avoid making output side measurements while still providing reasonable accuracy.

Flyback Ignitor/Keeper Power Supply

Startup of an HET is typically initiated by producing a localized plasma discharge between the cathode and an electrode in close proximity to the cathode, commonly referred to as the keeper orifice plate. Once the keeper plasma is established, the primary HET discharge can be more easily initiated. To ignite a plasma between the cathode and keeper orifice plate, a high voltage at the keeper orifice plate may be required. The common approach is to employ a high voltage pulsing circuit (e.g., 600 V peak, 500 hertz (Hz)) until keeper plasma ignition is detected and then transition to a current limited cathode keeper sustainer power supply (e.g., 30 VDC, 1 amp (ADC)). Given that these two required modes of operation have dissimilar voltage and current requirements, reducing circuit complexity and cost is a challenge.

However, some embodiments pertain to or utilize a cathode ignitor/keeper power supply based on a flyback topology that may achieve these goals. A flyback-based power supply in some embodiments is configured to output a high voltage at no-load conditions (e.g., 150 V), which may be maintained by the power supply until a cathode plasma forms. Once the plasma forms, a low impedance occurs on the output of the flyback converter and its operation inherently transitions to lower voltage, higher current limited output (e.g., 30 VDC, 1 ADC). By tuning the flyback power supply to produce a high output voltage at no-load, a separate high voltage ignitor circuit is not necessary for typical cathode ignitions. The flyback power supply of some embodiments thus acts as both the cathode plasma ignitor and sustainer.

The no-load output voltage of such a configured flyback supply may be DC rather than pulsed. The voltage may also be lower than the typical HET end-of-life requirement of 300 to 600 V. While HETs are historically specified with high voltage pulsed ignitors, significant test data demonstrates that high voltage DC ignitions are highly reliable. Furthermore, it has been demonstrated that well-constructed cathodes rarely require greater than 150 V for ignition, even at end-of-life conditions.

Employing a flyback converter for both ignition and sustaining the cathode plasma provides a low part count and a relatively simple implementation. It also may eliminate the need for a separate pulsed high voltage ignitor supply. Further, such a converter may eliminate the need to control the switching between an ignitor and a sustaining power supply.

Figure 8:
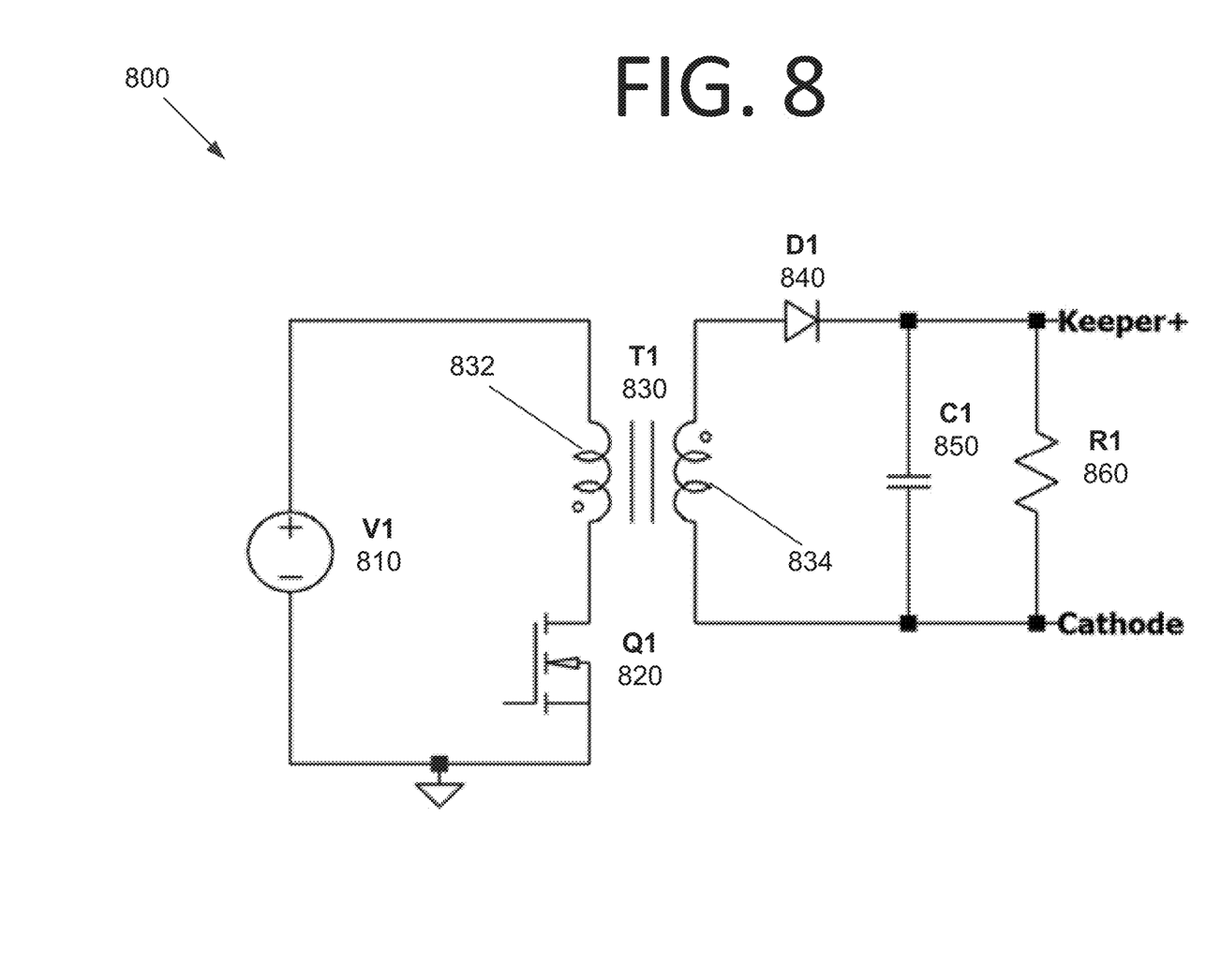
FIG. 8 is a circuit diagram illustrating a flyback ignitor/keeper power supply, according to an embodiment of the present invention.

FIG. 8 is a circuit diagram illustrating a flyback cathode ignitor/keeper power supply 800, according to an embodiment of the present invention. Flyback cathode ignitor/keeper power supply 800 includes a power source V1 810 and a metal-oxide-semiconductor field-effect transistor (MOSFET) Q1 820, which is the main switching MOSFET that applies an excitation voltage from V1 810 to a main power transformer T1 830 such that power can be transferred the output. Primary winding 832 and secondary winding 834 of T1 830 are setup in a "flyback" configuration such that when Q1 820 is on, the primary side of T1 830 is charged and no current flows in secondary winding 834. When Q1 820 is turned off, the stored energy is transferred to secondary winding 834 and released into the load. A blocking diode D1 840 allows the converter to function properly. A filter capacitor C1 850 smooths out the voltage ripple caused by the switching action, and R1 860 represents the load presented by the cathode plasma.

Figure 9:
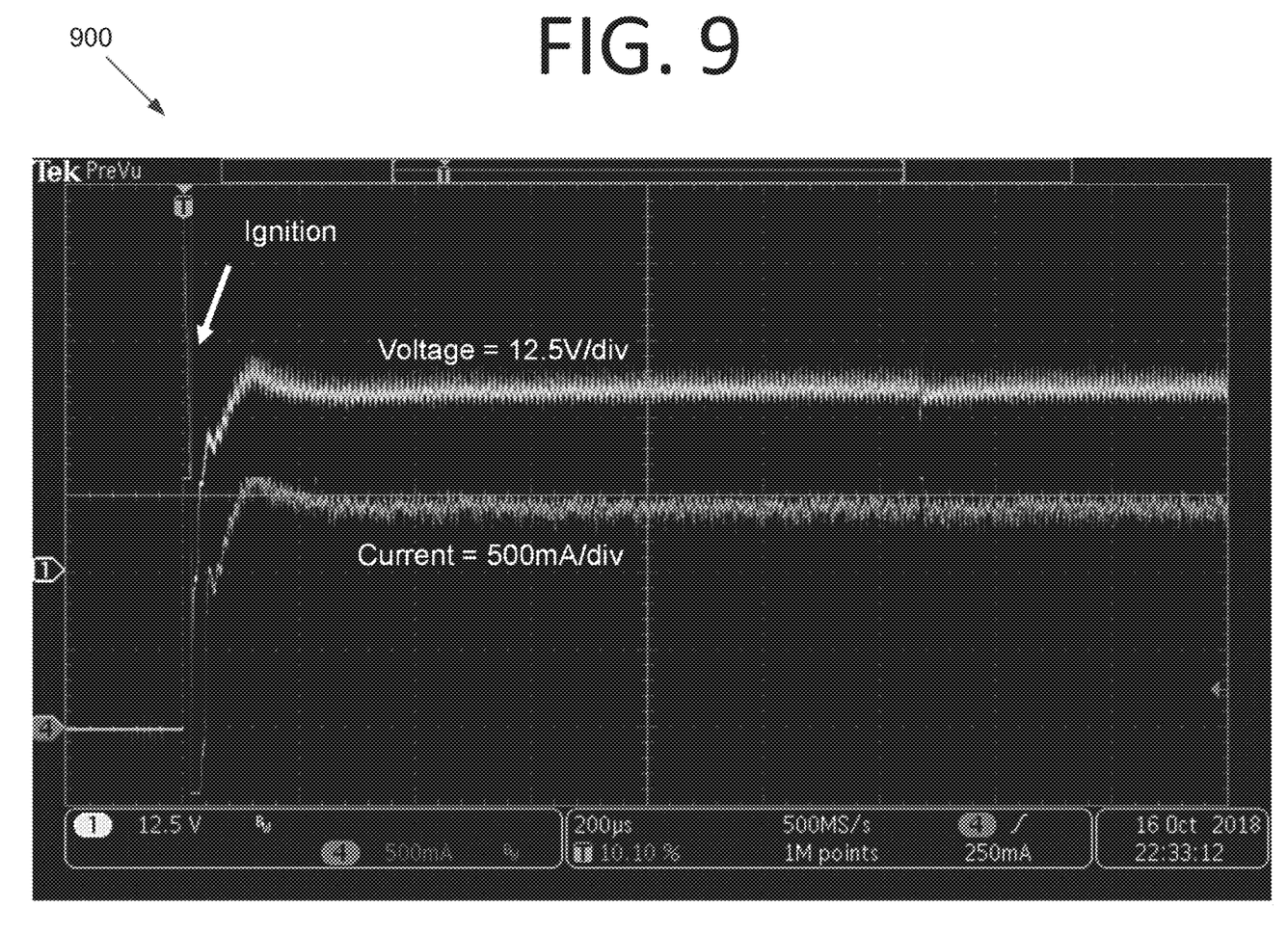
FIG. 9 is an oscilloscope capture illustrating flyback ignitor/keeper power supply ignition, according to an embodiment of the present invention.

FIG. 9 is an oscilloscope capture 900 illustrating flyback cathode ignitor/keeper power supply ignition, according to an embodiment of the present invention. More specifically, oscilloscope capture shows ignition from the open-circuit voltage of the flyback and verifies the demonstrated nominal cathode ignition curve. As the no-load output voltage on the flyback rises due to the open-circuit condition, a cathode plasma breakdown eventually occurs just based on the keeper power supply output alone and a plasma forms, which is indicated by the rising current. This demonstrates ignitor and sustainer capability from one circuit. While conventional PPUs pulse (e.g., from 300 V to 0 V at 500 Hz) until ignition is detected, some embodiments provide adequate ignition capabilities. This allows for reduction in size of the PPU since the circuitry for providing pulsed functionality does not decrease with the size of the system.

Parallel High Voltage Dc Supply for Off-Nominal Conditions

A cathode at end-of-life or off-nominal conditions may on rare occasion require a higher voltage than reasonably provided by a flyback with no-load (e.g., 150 VDC). Accordingly, some embodiments modify the flyback cathode ignitor/keeper power supply described above, adding a supplemental high voltage cathode ignitor DC power supply with relatively few parts to address higher voltage end-of-life requirements (e.g., 300 VDC) than otherwise achievable with the flyback cathode ignitor/keeper power supply alone. While the flyback cathode ignitor/keeper power supply provides a sufficient no-load output voltage to nominally ignite a cathode keeper plasma, a parallel high voltage DC source (e.g., an isolated, open-loop, push-pull voltage multiplier circuit) may be integrated in parallel to the flyback output to generate higher DC voltages during start-up to aid with off-nominal cathode ignitions.

Figure 10:
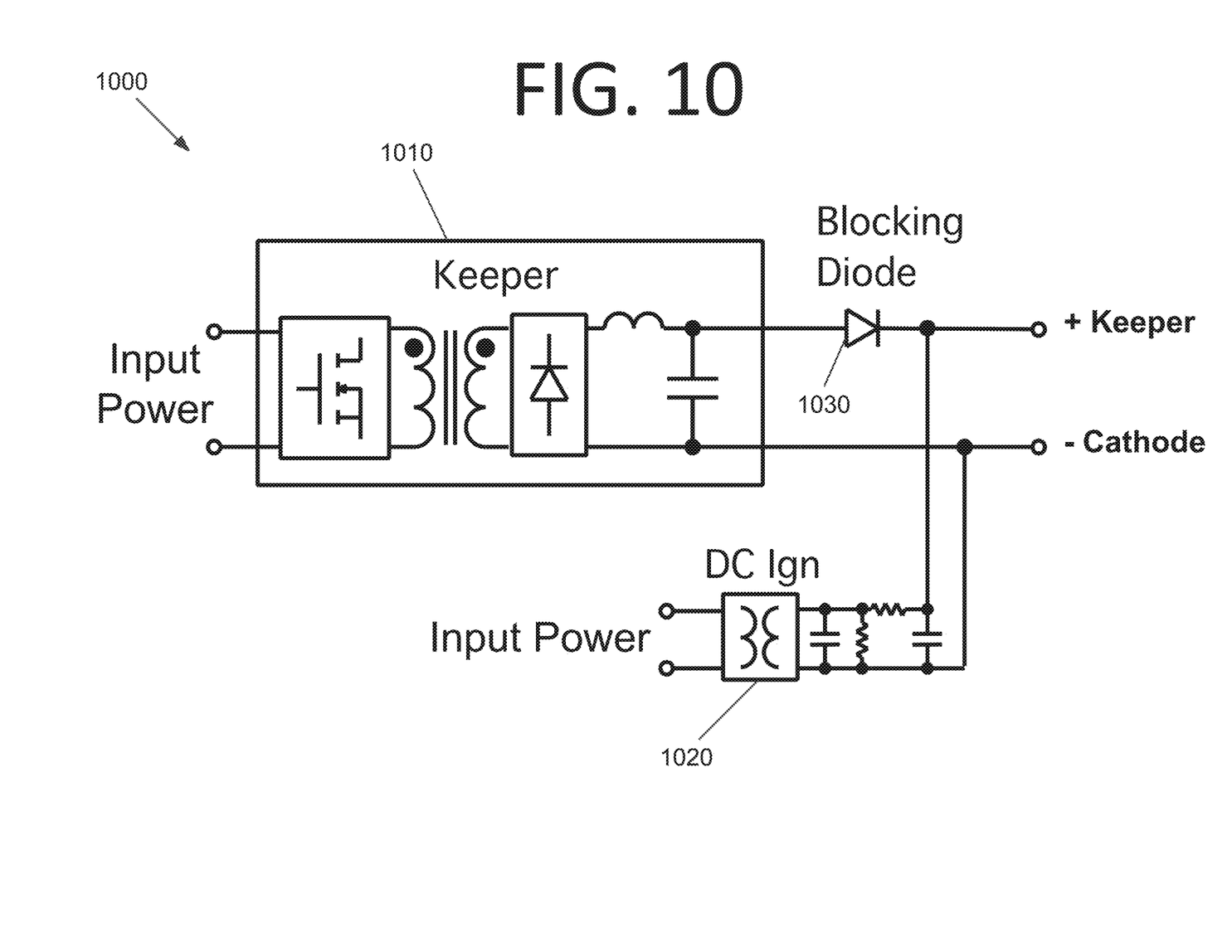
FIG. 10 is a circuit diagram illustrating an ignitor/keeper power supply with a parallel high voltage DC ignitor, according to an embodiment of the present invention.
Figure 11:
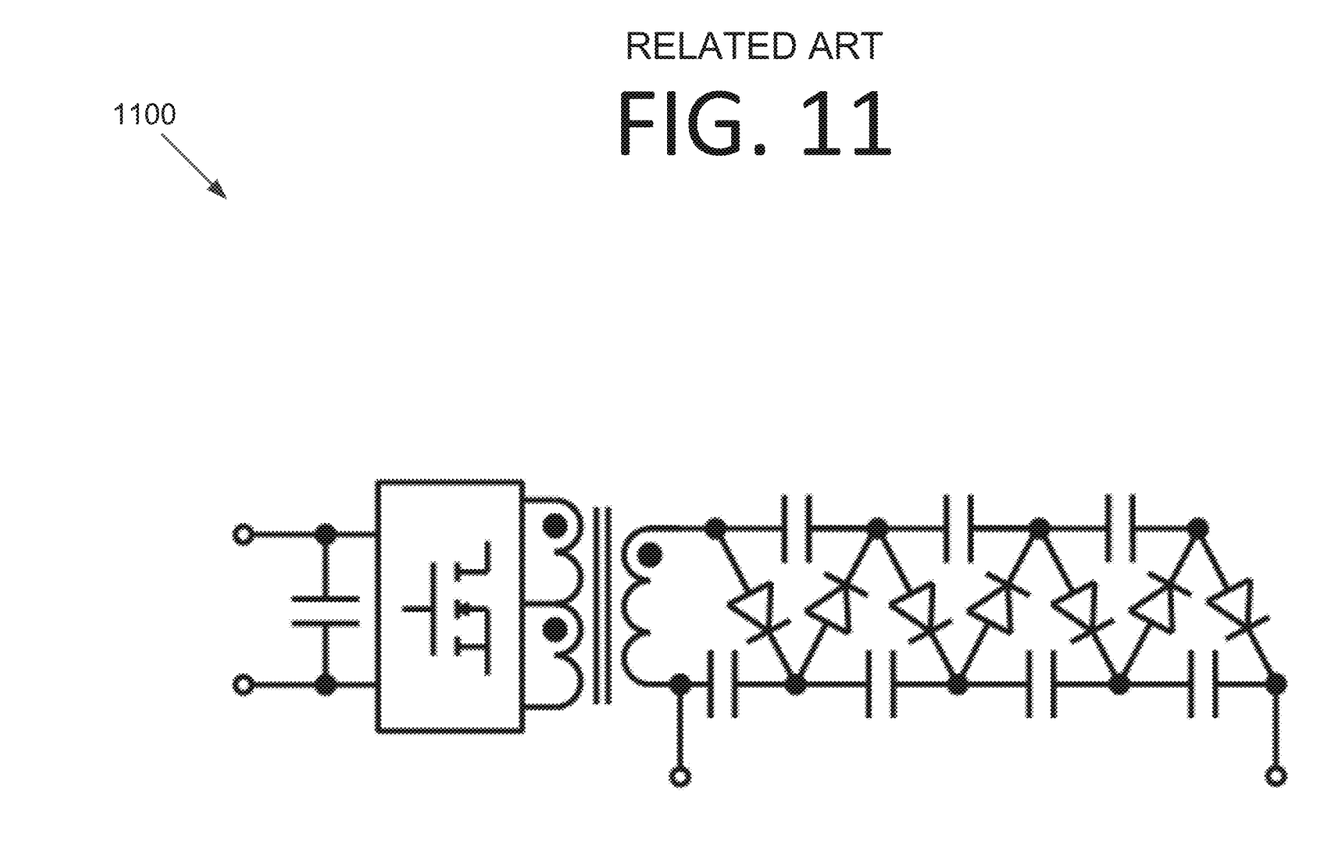
FIG. 11 is a circuit diagram illustrating a Cockroft-Walton high voltage DC power supply.

FIG. 10 is a circuit diagram 1000 illustrating a flyback cathode ignitor/keeper power supply 1010 with a parallel high voltage DC ignitor 1020, according to an embodiment of the present invention. In some embodiments, a Cockcroft-Walton voltage multiplier circuit (e.g., Cockcroft-Walton voltage multiplier 1100 of FIG. 11) fed from an open-loop push-pull converter is used as DC ignitor 1020 and placed in parallel with a cathode sustaining flyback cathode ignitor/keeper power supply 1010. In some embodiments, flyback cathode ignitor/keeper power supply 1010 may be flyback cathode ignitor/keeper power supply 800 of FIG. 8. A Cockcroft-Walton voltage multiplier can achieve high voltages (e.g., greater than 600 V) necessary to ignite a cathode that is demonstrating significantly degraded ignition behavior. A high voltage blocking diode 1030 protects components of lower voltage flyback cathode ignitor/keeper power supply 1010 from the high voltage produced by supplemental DC ignitor circuit 1020. Once a plasma has ignited and the impedance on the output of flyback keeper supply 1010 decreases, flyback cathode ignitor/keeper power supply 1010 inherently takes over supplying the current needed to sustain the plasma. Supplemental DC ignitor circuit 1020 can then be deactivated.

A Crockcroft-Walton voltage multiplier circuit provides a straightforward mechanism to achieve high DC output voltages while keeping part stress and component count low. Exact voltage regulation is not needed for cathode ignition, so the Crockcroft-Walton circuit can be driven with a simple push-pull power stage operating in open loop. This is much simpler to implement than a regulated power supply. The supplemental DC ignitor can achieve high DC output voltage for cathode ignition with reduced complexity and more compactness than heritage pulsed ignitor designs.

Figure 12:
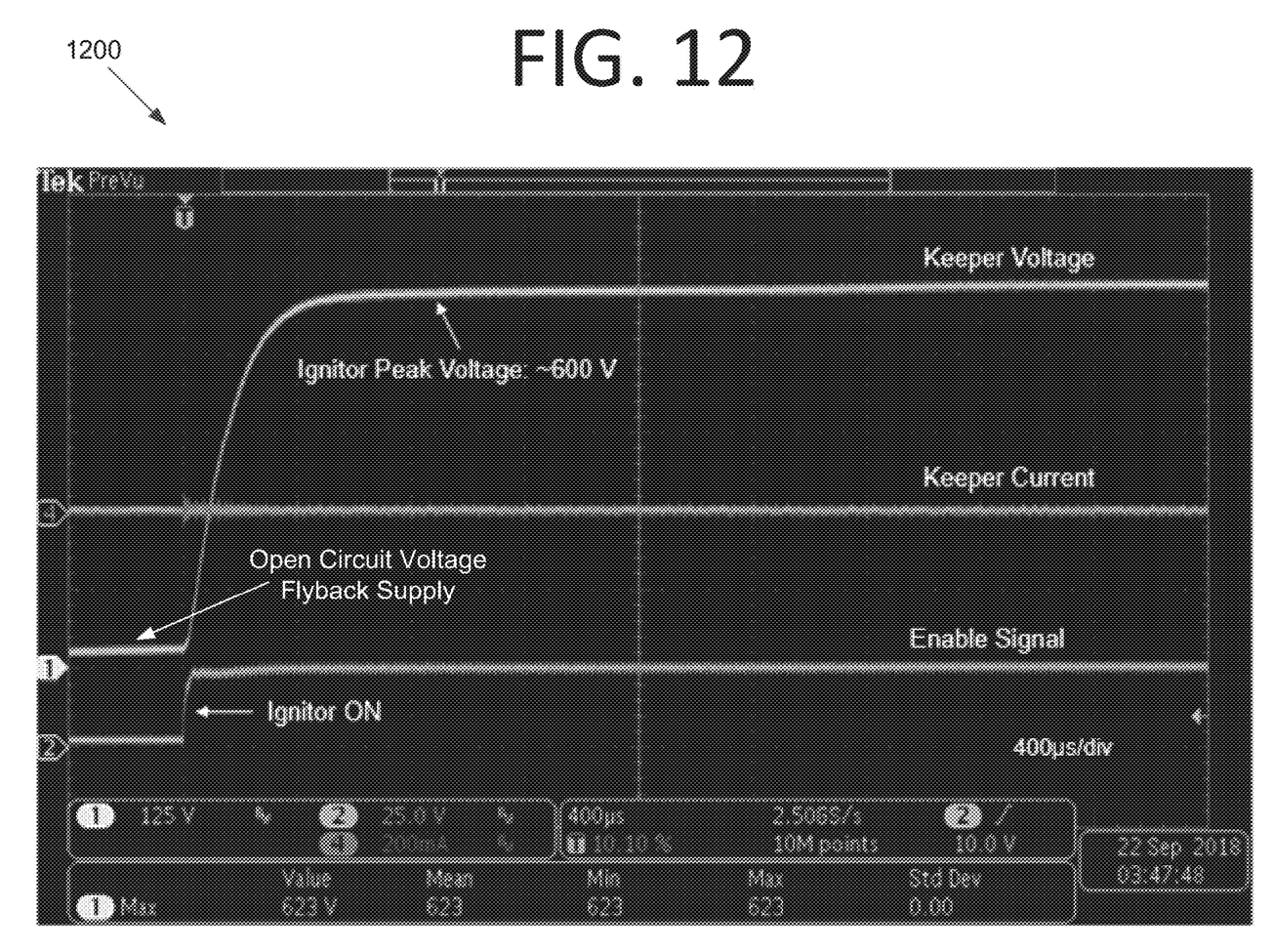
FIG. 12 is an oscilloscope trace illustrating ignitor circuit operation, according to an embodiment of the present invention.

FIG. 12 is an oscilloscope trace 1200 illustrating ignitor circuit operation, according to an embodiment of the present invention. Oscilloscope capture 1200 shows the results of a test that was conducted to demonstrate the output voltage capability of the DC ignitor circuit. The DC ignitor circuit was turned on into a cold cathode such that a successful cathode start would not be possible, and the peak voltage the igniter was capable of was measured. This is a way to demonstrate that a DC ignitor circuit integrated with the flyback cathode ignitor/keeper power supply circuit is a good way to generate and hold a high voltage.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A scalable power processing unit (PPU), comprising:
a plurality of parallel discharge supply modules (DSMs) comprising respective current estimator circuits, each of the respective current estimator circuits configured to provide a representative signal of an output current for each respective DSM of the plurality of parallel DSMs, wherein the respective current estimator circuits are configured to use a primary current signal and an output voltage feedback signal from the each respective DSMs without additional sensing to generate the representative signal of the output current of the each respective DSM,
wherein each of the respective current estimator circuits comprises:
a buffer amplifier configured to buffer the primary current signal from the each respective DSM of the plurality of parallel DSMs;
a peak holding capacitor configured to hold a peak value of the primary current signal after being buffered by the buffer amplifier, and
a voltage-controlled current source circuit configured to estimate a downslope of an output inductor current based on a known inductance value of the inductor, an output voltage telemetry, and a primary side current; and
a flyback cathode ignitor/keeper power supply circuit configured to ignite and sustain plasma at a cathode.

2. The PPU of claim 1, wherein the each respective DSM of the plurality of parallel DSMs further comprises:
a pulse-width-modulation (PWM) circuit, the PWM circuit configured to use the representative signal of the output current of each respective DSM of the plurality of parallel DSMs from the respective current estimator circuit to force load sharing between the plurality of parallel DSMs.

3. The PPU of claim 1, wherein the each respective DSM of the plurality of parallel DSMs comprises:
a power stage;
a plurality of series rectifiers; and
respective LC filters operably connected to each series rectifier of the plurality of series rectifiers, wherein each LC filter is configured to low-pass filter and average a voltage waveform from a respective series rectifier of the plurality of series rectifiers before the voltage waveform is measured for telemetry and by a respective current estimator circuit.

4. The PPU of claim 1, wherein the cathode ignitor/keeper flyback power supply circuit is configured to output a no-load direct current (DC) output voltage to achieve cathode keeper ignition.

5. The PPU of claim 1, wherein the cathode ignitor/keeper flyback power supply circuit comprises:
a metal-oxide-semiconductor field-effect transistor (MOSFET);
a main power transformer operably connected to the MOSFET and comprising a primary winding and a secondary winding; and
a load operably connected to a secondary side of the main power transformer; wherein
the MOSFET is configured to apply an excitation voltage from a voltage source to the main power transformer, and
the primary winding and the secondary winding of the main power transformer are setup in a "flyback" configuration such that when the MOSFET is on, a primary side of the main power transformer transistor is charged and no current flows in the secondary winding, and when the MOSFET is turned off, stored energy in the main power transistor is transferred to the secondary winding and released into the load.

6. The PPU of claim 5, wherein the cathode ignitor/keeper flyback power supply circuit further comprises:
a blocking diode operably connected to the secondary side of the main power transformer; and
a filter capacitor configured to smooth out a voltage ripple caused by switching of the MOSFET.

7. The PPU of claim 5, wherein the load is presented by a keeper plasma of a Hall-effect thruster (HET).

8. The PPU of claim 1, further comprising:
a supplemental direct current (DC) ignitor in parallel with the cathode ignitor/keeper flyback power supply circuit, the supplemental DC ignitor configured to provide a no-load output voltage to ignite a cathode keeper plasma when the cathode ignitor/keeper flyback power supply circuit fails to achieve ignition of the cathode keeper plasma.

9. The PPU of claim 8, wherein the supplemental DC ignitor comprises an open-loop push-pull converter.

10. The PPU of claim 8, further comprising:
a blocking diode configured to protect components of the cathode ignitor/keeper flyback power supply circuit from a voltage produced by the supplemental DC ignitor.

* * * * *